April 18, 1933.     T. M. MacCASKIE     1,904,923
AEROPLANE
Filed March 21, 1930     3 Sheets-Sheet 1
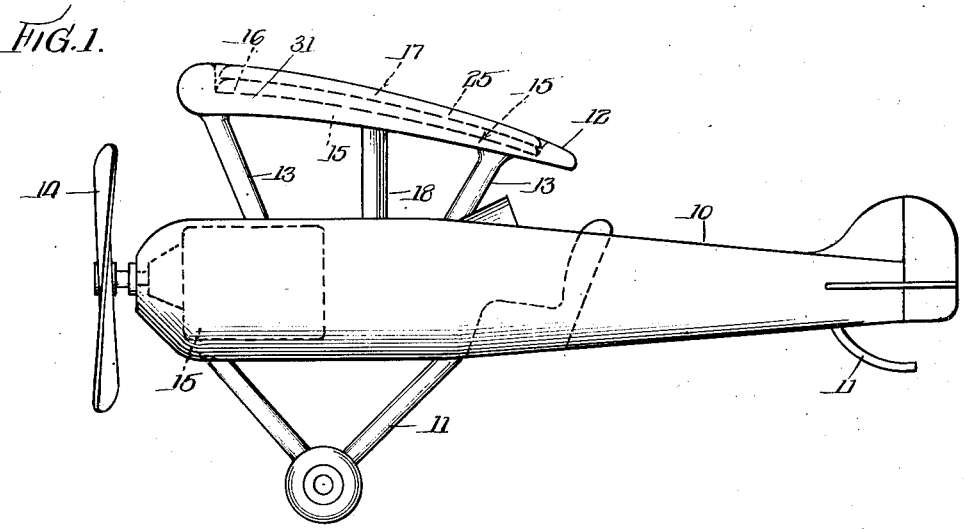
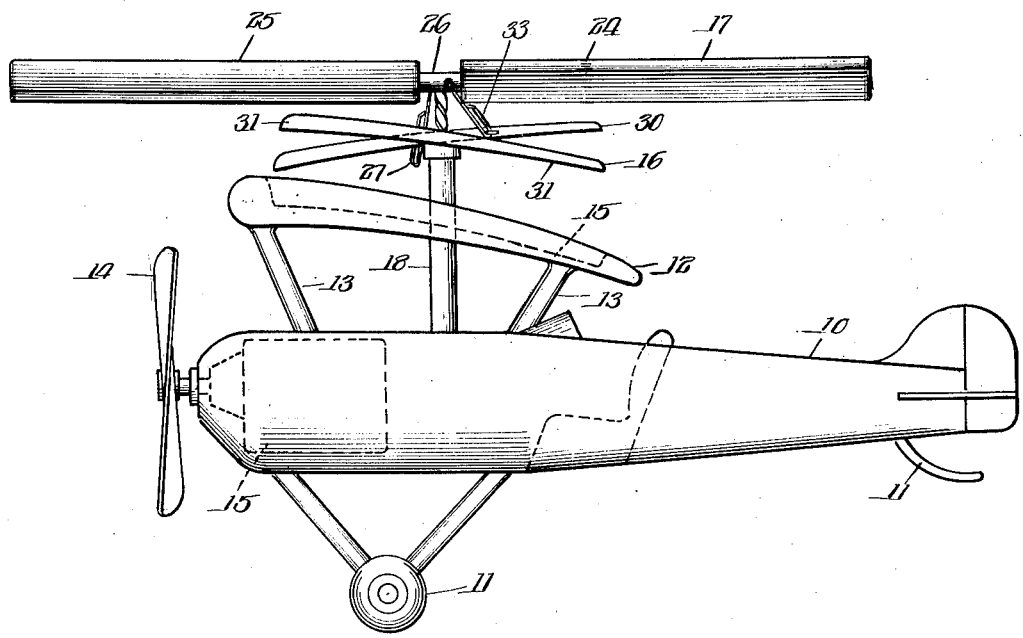
Inventor
Thomas Murdoch MacCaskie,
By Cheever, Cox & Moore
attys

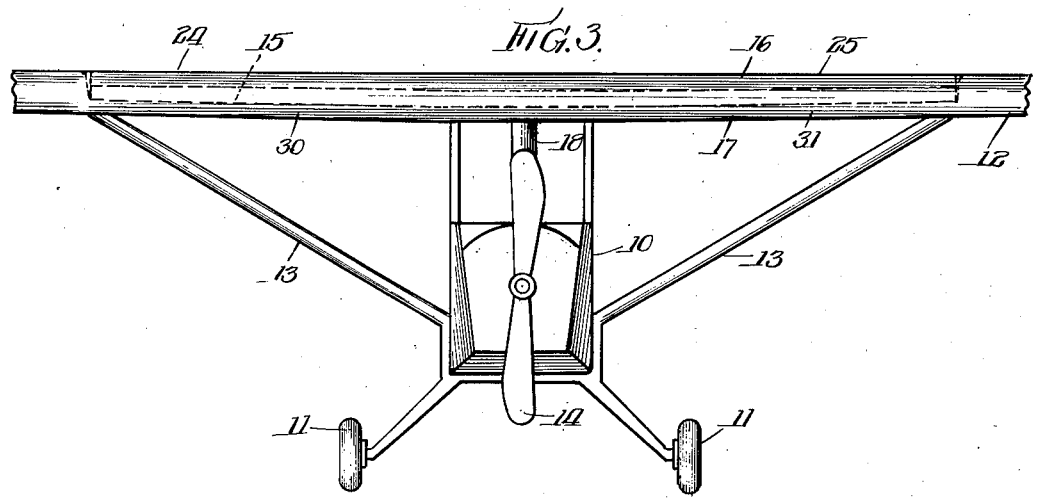
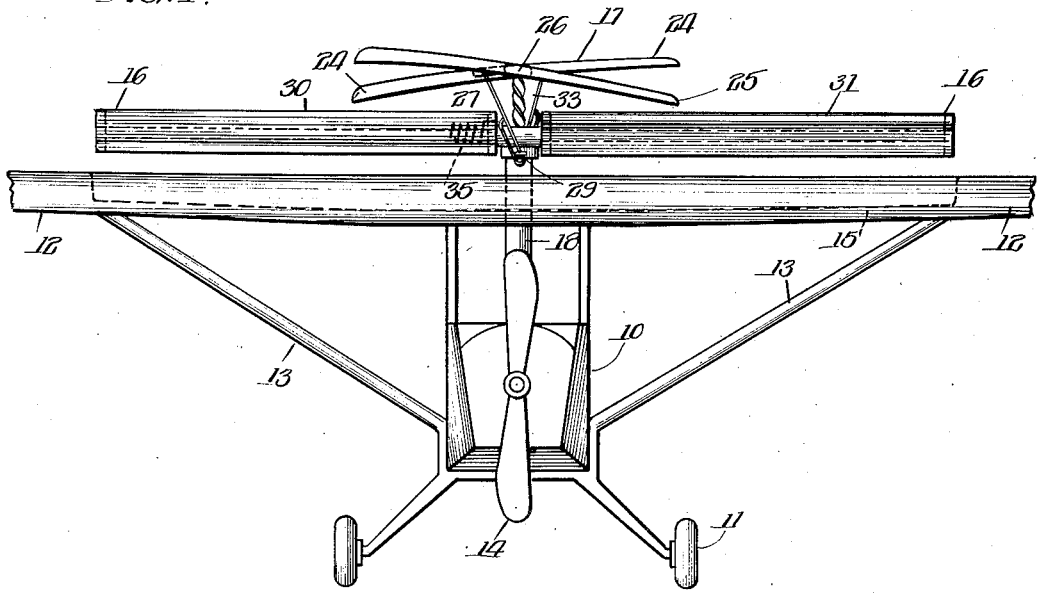

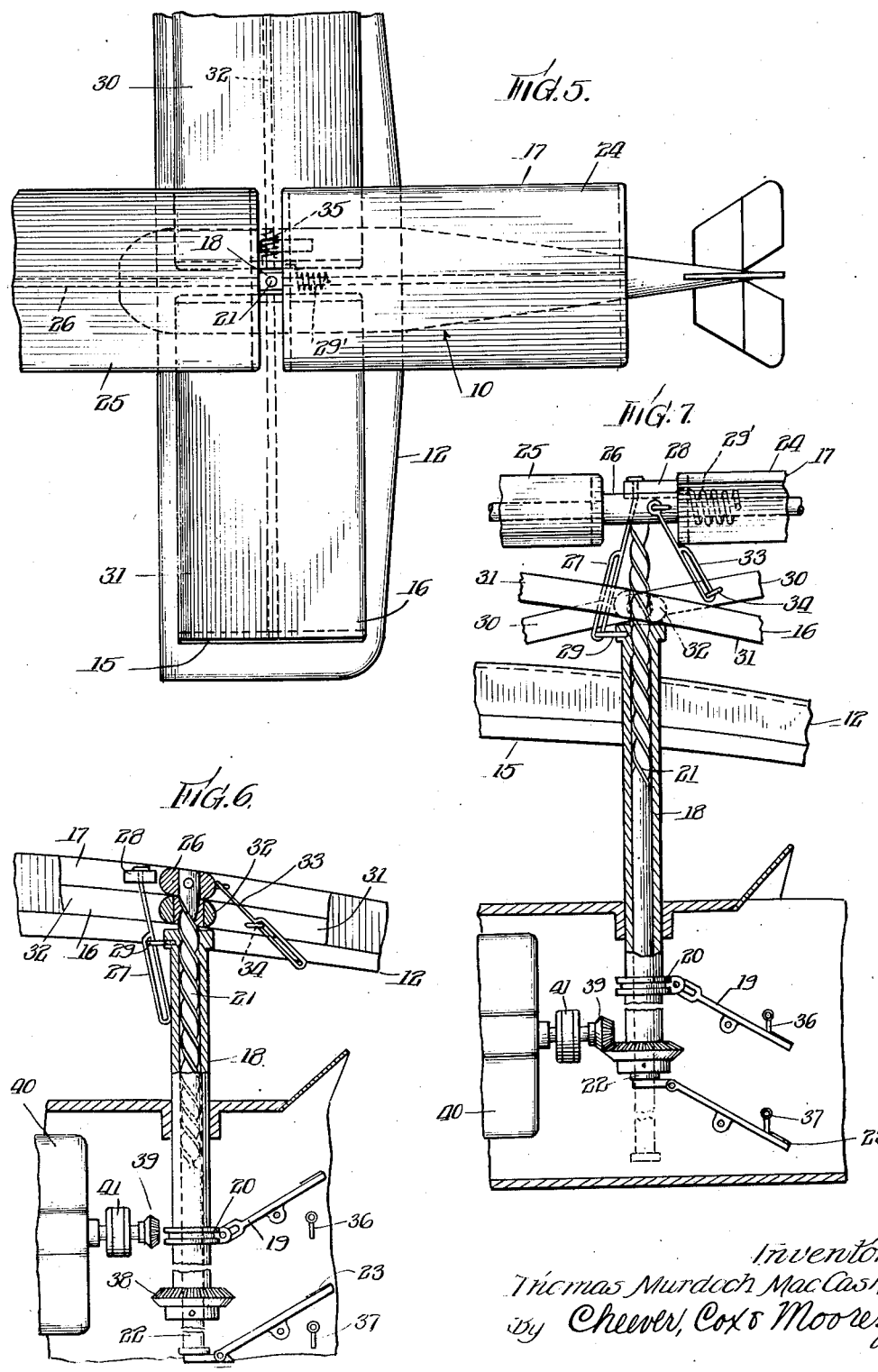

Patented Apr. 18, 1933

1,904,923

UNITED STATES PATENT OFFICE

THOMAS MURDOCH MacCASKIE, OF CHICAGO, ILLINOIS, ASSIGNOR TO HATHAWAY WATSON, OF CHICAGO, ILLINOIS

AEROPLANE

Application filed March 21, 1930. Serial No. 437,727.

This invention relates to aeroplanes in general and particularly to means which add to the factor of safety of aeroplanes.

The primary object of the invention is to provide new and improved means for increasing the factor of safety in aeroplanes should the driving member of the plane become disabled.

Another object is to provide an aeroplane having a plurality of movable wings normally concealed in the wing construction of the plane whereby the wings may be projected from the regular wing construction to act as a helicopter in ascending and as a gyropter in descending.

A further object is to provide the normal wing of an aeroplane with a plurality of other wings, which may be normally concealed within the main plane wing during normal flight of the plane and which can be projected from the main wing as desired.

A further object is to provide a split wing construction whereby a plurality of auxiliary wings are housed within the main wing of the plane.

A still further object is to provide means for operating auxiliary wings which are normally concealed within the main wing and which are provided with means for driving the auxiliary wings in one direction to form a helicopter and to permit free rotary movement of the wings to act as a gyropter in descending.

Another object is to provide an aeroplane, either of the monoplane or biplane type, which is provided with a rotatably mounted wing or section whereby the plane may be converted into a helicopter or a gyropter.

Still another object is to provide a split wing construction for aeroplanes whereby the top surface of the top wing is automatically convertible into a helicopter and powered in such a manner that it is capable of raising the plane vertically into the air and which has free movement and automatically becomes a gyropter in descending.

Numerous other objects and advantages will be apparent throughout the progress of the following specification.

The invention comprises in general an aeroplane having a main wing which is recessed to receive a pair of auxiliary wings. These wings are mounted on a vertically movable member so that they may be raised from the recess in the main wing. A spiral member is operatively arranged in the vertically movable member and is operatively connected to the auxiliary wings so that one auxiliary wing will be raised from its cooperating auxiliary wing and maintained at right angles thereto. Each auxiliary wing is made in two sections, and means are provided to tilt one section relative to the other section. Power driven means may be operatively connected to the vertical member to rotate these auxiliary wings to form a helicopter. A clutch is provided between the vertical member and the power driven means to prevent the driving of the auxiliary wings. The auxiliary wings are therefore free to rotate by the action of the air against the auxiliary wings whereby a gyropter is provided in descending.

The accompanying drawings illustrate a selected embodiment of the invention and the views therein are as follows:

Fig. 1 is a detail side view of an aeroplane embodying the invention.

Fig. 2 is a similar view showing the auxiliary wings extended in operating position.

Fig. 3 is a detail front elevation of an areoplane embodying the invention.

Fig. 4 is a similar view showing the auxiliary wings extended in operating position.

Fig. 5 is a detail top plan view showing the auxiliary wings in position when acting as a helicopter or gyropter.

Fig. 6 is a detail sectional view showing the means for controlling the auxiliary wings with the wings in normal or collapsed position.

Fig. 7 is a similar view showing the auxiliary wings in raised position.

Referring to the drawings, 10 designates an aeroplane body to which the usual landing gear 11, 11 is secured. A main wing 12 is operatively supported on struts 13 in the usual manner, and a propeller 14 driven by an engine or motor 15 is ranged in the forepart of the plane in the usual manner.

The main wing 12 is cut out between its marginal edges to provide a recess 15 into which auxiliary wings 16 and 17 are arranged in folded or collapsed position during normal operation of the plane. These auxiliary wings are operatively connected to a vertically movable member 18, Figs. 6 and 7, which extends through the main wing 12 and is supported in any desirable manner. Means, such as a lever 19 engageable with a collar 20 on the member 18, is provided for raising the member 18, Fig. 7, to lift the auxiliary wings out of the recess in the main wing. The lower auxiliary wing 16 is directly connected to the member 18 while the other auxiliary wing 17 is directly connected to a spiral member 21 which is operatively arranged in the vertically movable member 18. The end 22 of the spiral member extends below the end of the vertically movable member 18 and is operated by a lever arrangement 23 for raising the spiral member within the vertically movable member 18. Upon operating the lever 23, the spiral member will turn in the member 18 and raise the auxiliary wing 17 away from the lower auxiliary wing 16, Fig. 7. The upward movement of the spiral member also has turning movement, thereby causing the upper wing 17 to not only be raised above the lower auxiliary wing 16, but also turned ninety degrees so that the upper auxiliary wing will be at substantially right angles to the lower auxiliary wing.

The upper wing 17 is preferably divided transversely at the center thereof to provide separate sections 24 and 25. The section 24 is tiltably movable relative to its longitudinal axis 26, while the wing 25 is rigidly connected to the axis 26 and maintained at a fixed angle. An operating element 27 is fastened to a projection 28 on the movable section 24 and to the vertical member as indicated at 29, Fig. 7. This arrangement therefore causes the section 24 to be maintained at an angle relative to the other secion 24 when the wing 17 is in extended position. A spring 29' is arranged in the section 24 for returning the section 24 to normal position when the wings are returned into their recess 15.

The lower auxiliary wing 16 is also made in two sections 30 and 31. The section 31 is rigid with its axis 32 while the section 30 is adapted to be tilted. The tilting of the section 30 is caused by an element 33 which engages the axis 26 of the wing 17 and a projection 34 on the section 30. The rigid section 31 is therefore maintained at a fixed angle, while the other section 30 is tiltably mounted so that it can be maintained at an angle to the fixed section 31. Upward movement therefore of the spiral member raises the wing 17 above the wing 16, causes the wing 17 to be maintained at an angle of substantially ninety degrees relative to the wing 16, and tilts the sections of each wing at an angle relative to each other.

The tiltable wing section 30 of auxiliary wing 16 is also provided with a spring 35 which is similar in all respects to the spring 29' and operates this section of the wing in the same manner as the spring 29' operates auxiliary wing section 24.

A catch 36, Fig. 7, is provided to cooperate with lever 19 so that the vertical member 18 may be held in up position.

Another catch 37 is provided to cooperate with lever 23 for holding the spiral member in place when the spiral member is in up or raised position.

A gear 38, Figs. 6 and 7, is fastened to the vertical member 18 and is adapted to mesh with a gear 39 on a prime mover 40 to rotate the vertical member 18 when the auxiliary wings are raised as a helicopter for raising the plane vertically. A clutch 41 is interposed between the prime mover 40 and the gear 39 to prevent rotation of the vertical member when a gyropter is provided in descending.

The invention provides an aeroplane which has auxiliary wings normally concealed in an open skeleton main wing construction. Means are provided to rotate these wings to provide a helicopter for raising the plane vertically. Means are also provided to prevent the wings from being driven so that they may rotate freely in the air during descent to act as a gyropter for the plane.

When the plane is in flight and something should happen to the propelling mechanism, or the plane should become otherwise disabled, the vertical member and the spiral member may be operated to extend the auxiliary wings thereby permitting the plane to drop gradually, the wings acting as a gyropter.

In starting it is not necessary to have the usual take-off as the auxiliary wings may be extended and the prime mover operated for rotating the auxiliary wings to cause the plane to rise vertically as a helicopter.

The gear on the vertical member is only in engagement with the prime mover when the wings are extended. This construction prevents any chance of rotating the auxiliary wings when they are arranged in their pocket or recess. A clutch is provided between the prime mover and the operating gear so that the plane may be operated as a helicopter while the prime mover rotates the vertical member, or it may be used as a gyropter by disconnecting the prime mover from the member by throwing out the clutch. In descending the prime mover may be operated, if desired, to control the descent of the plane.

The construction herein shown adds considerably to the factor of safety in aeroplane construction, and a plane constructed in accordance with the present invention is efficient in operation and can be easily and readily controlled.

While the parts herein shown are applied to a monoplane, it is to be understood that they may be applied and successfully operated on a biplane or any other type of aeroplane, and while only one section of each wing is shown tiltably mounted, both sections may be made tiltably mounted or each wing construction may be made in more than two sections.

Changes may be made in the form, construction, and arrangement of the various parts without departing from the spirit of the invention or sacrificing any of its attendant advantages, and the right is hereby reserved to make all such changes as fairly fall within the scope of the following claims.

The invention is hereby claimed as follows:

1. An aeroplane comprising a wing having a pocket or recess provided therein, a pair of auxiliary wings arranged in said recess, means for elevating said auxiliary wings upwardly from said wing and out of said pocket, means for raising one of said auxiliary wings above the other and at right angles thereto and means for tilting one part of an auxiliary wing relative to another part thereof.

2. An aeroplane comprising a main wing construction, a plurality of auxiliary wings arranged in nested formation against said main wing, means for extending one of said auxiliary wings above the main wing, means for raising another auxiliary wing above the main wing but below the first named auxiliary wing and at right angles thereto, and means for tilting one part of said first named auxiliary wing at an angle relative to another part of said other wing.

3. An aeroplane comprising a main wing, a pair of auxiliary wings removably nested in said main wing, means for raising said auxiliary wings from the main wing and moving one auxiliary wing at right angles to the other, means for rotating said auxiliary wings, each auxiliary wing comprising a pair of sections, one section of each auxiliary wing being tiltably movable relative to its other section.

4. An aeroplane comprising a main wing, an auxiliary wing supportingly mounted in said main wing, a second auxiliary wing supportingly mounted above said other auxiliary wing, means for raising both of said auxiliary wings, means for raising said second auxiliary wing above the first auxiliary wing and turning it in a horizontal plane at an angle relative to said first named auxiliary wing.

5. An aeroplane comprising a main wing, an auxiliary wing supportingly mounted in said main wing, a second auxiliary wing supportingly mounted above said other auxiliary wing, means for raising both of said auxiliary wings, means for raising said second auxiliary wing above the first auxiliary wing and turning it in a horizontal plane at an angle relative to said first named auxiliary wing, power means for driving said auxiliary wings, means for preventing the power means from driving said wings but permitting rotary movement thereof whereby said auxiliary wings act as a helicopter or a gyropter as required.

6. An aeroplane comprising a main wing, an auxiliary wing supportingly mounted in said main wing, a second auxiliary wing supportingly mounted above said other auxiliary wing, means for raising both of said auxiliary wings, means for raising said second auxiliary wing above the first auxiliary wing and turning it in a horizontal plane at right angles to said first named auxiliary wing, each auxiliary wing comprising a pair of sections, means for tilting one section of each auxiliary wing at an angle relative to the other section, power means for driving said auxiliary wings, means for preventing the power means from driving said wings but permitting rotary movement thereof whereby said auxiliary wings act as a helicopter or a gyropter as required.

In witness whereof, I have hereunto subscribed my name.

THOMAS MURDOCH MacCASKIE.